United States Patent
Maret et al.

(10) Patent No.: US 12,294,213 B2
(45) Date of Patent: *May 6, 2025

(54) MONITORING SYSTEM FOR REMOTELY MONITORING A STATE OF POLE-MOUNTED EQUIPMENT IN A POWER DISTRIBUTION OR TRANSMISSION GRID, GRID EQUIPMENT HAVING THE MONITORING SYSTEM, AND CORRESPONDING METHOD

(71) Applicant: Hitachi Energy Ltd, Zürich (CH)

(72) Inventors: Yannick Maret, Dättwil (CH); Xavier Kornmann, Lauchringen (DE); Daniel Neeser, Thalwil (CH); Stefano Bertoli, Wettingen (CH); Ektor Sotiropoulos, Horgen (CH); Martin Schick-Pauli, Zürich (CH); Gian-Luigi Madonna, Otelfingen (CH); Philipp Sommer, Zürich (CH); Alexander Fach, Boppelsen (CH)

(73) Assignee: Hitachi Energy Ltd, Zürich (CH)

( * ) Notice: Subject to any disclaimer, the term of this patent is extended or adjusted under 35 U.S.C. 154(b) by 440 days.

This patent is subject to a terminal disclaimer.

(21) Appl. No.: 17/602,322

(22) PCT Filed: Apr. 9, 2019

(86) PCT No.: PCT/EP2019/058943
§ 371 (c)(1),
(2) Date: Oct. 8, 2021

(87) PCT Pub. No.: WO2020/207563
PCT Pub. Date: Oct. 15, 2020

(65) Prior Publication Data
US 2022/0200333 A1 Jun. 23, 2022

(51) Int. Cl.
*H02J 13/00* (2006.01)

(52) U.S. Cl.
CPC .... *H02J 13/0004* (2020.01); *H02J 13/00002* (2020.01); *H02J 13/00022* (2020.01)

(58) Field of Classification Search
CPC ............. H02J 13/0004; H02J 13/00002; H02J 13/00022; H02J 3/00; H02H 3/044; Y04S 10/20
(Continued)

(56) References Cited

U.S. PATENT DOCUMENTS

| 9,716,971 B2 | 7/2017 | Steiger et al. | |
| 2006/0056370 A1 * | 3/2006 | Hancock | H04W 24/00 370/254 |

(Continued)

FOREIGN PATENT DOCUMENTS

| DE | 19817938 A1 * | 10/1999 | ............... H01H 9/16 |
| WO | WO-2008092469 A1 * | 8/2008 | ............. H01H 85/30 |

OTHER PUBLICATIONS

International Search Report and Written Opinion of the International Searching Authority, PCT/EP2019/058943, mailed Aug. 26, 2019, 13 pages.

*Primary Examiner* — Thomas C Lee
*Assistant Examiner* — Michael Tang
(74) *Attorney, Agent, or Firm* — Sage Patent Group (57) ABSTRACT

A monitoring system for remotely monitoring a state of pole-mounted equipment in a power distribution or transmission grid is provided. The pole-mounted equipment includes an indicator device configured to present state information indicative of a state of the pole-mounted equipment. The monitoring system includes a status monitoring device movable via a drive or propulsion system. The status monitoring device is configured to obtain the state information from the indicator device when located within a communication range of the indicator device.

18 Claims, 7 Drawing Sheets

(58) Field of Classification Search
USPC .............. 340/870.16, 870.17, 870.2; 702/62; 700/292
See application file for complete search history.

(56) References Cited

U.S. PATENT DOCUMENTS

| | | | |
|---|---|---|---|
| 2009/0015991 A1* | 1/2009 | Hyrenbach | H02B 13/045 361/612 |
| 2016/0086339 A1 | 3/2016 | Steiger et al. | |
| 2016/0216304 A1* | 7/2016 | Sekelsky | B60L 53/126 |
| 2017/0133846 A1 | 5/2017 | Janik | |
| 2018/0238955 A1* | 8/2018 | Bango | G08B 21/02 |
| 2019/0114816 A1* | 4/2019 | Tham | G06T 19/006 |
| 2020/0028351 A1* | 1/2020 | Agliata | H02J 3/00 |
| 2020/0251927 A1* | 8/2020 | Coats | H02J 11/00 |
| 2020/0327831 A1* | 10/2020 | Tenthorey | G09F 7/18 |
| 2021/0397132 A1* | 12/2021 | Maier | G04B 19/247 |

* cited by examiner

MONITORING SYSTEM FOR REMOTELY MONITORING A STATE OF POLE-MOUNTED EQUIPMENT IN A POWER DISTRIBUTION OR TRANSMISSION GRID, GRID EQUIPMENT HAVING THE MONITORING SYSTEM, AND CORRESPONDING METHOD

CROSS REFERENCE TO RELATED APPLICATIONS

This application is a 35 U.S.C. § 371 national stage application of PCT International Application No. PCT/EP2019/058943 filed on Apr. 9, 2019, the disclosure and content of which is incorporated by reference herein in its entirety.

TECHNICAL FIELD

The present disclosure relates to a monitoring system for remotely monitoring a state of pole-mounted equipment in a power distribution or transmission grid.

BACKGROUND OF THE DISCLOSURE

In a power distribution or transmission grid, herein also simply referred to as a power grid, overhead power transmission lines may be mounted on poles, i. e. posts or pylons. Various types of equipment are adapted to be mounted directly to a pole of the power grid. Such pole-mounted equipment may serve the purpose of protecting the power grid or parts thereof, such as in a surge overvoltage protection. Other types of pole-mounted equipment, such as transformers, may also serve the purpose of ensuring power distribution.

Pole-mounted protection equipment may, for example, be surge arresters, which can be considered as important protection devices in electrical network and protect expensive equipment, such as distribution transformers, against overvoltage surge by locally limiting energy of the overvoltage surge. Preferably, they are installed in group of three on three-phase poles that have a phase-to-ground connection. Another example for pole-mounted equipment are the distribution transformers themselves.

The surge arrester can absorb a limited amount of energy and it may fail after a certain number of protection events and/or a certain overload (e.g. amount and/or duration of an overcurrent). The surge arrester may typically fail by thermal overload which means that the surge arrester may overheat and in extreme cases emit sparks and/or even explode.

To limit such a risk, disconnector devices have been developed, so-called spark prevention units (SPU), whose objective is to disconnect, in a spark-safe way, the surge arrester before a failure occurs. These disconnector devices may reduce the above-mentioned risk by disconnecting the surge arrester before thermal overload. Once disconnected, the surge arrester is removed from the electrical network. There may be a local visual indicator on the SPU that visualizes that the SPU has disconnected (tripped), but visual monitoring may be prone to errors.

When a utility network like a power grid or a power distribution network includes a large number of disconnector devices including SPUs (typically tens to hundreds of thousands), it becomes cumbersome to determine if these are all still connected. Presently, it is required to send out a service crew that visually inspects each and every disconnector device. This is a time intensive task: a given SPU may therefore be inspected only once every year or even less often. A disconnected SPU could thus be in the network for a long period of time. That means that in this location no protection against surge is available, since the surge arrester has been disconnected from the power grid. Analogous considerations also apply for other pole-mounted equipment such as for fuse cutouts that protect distribution transformers against overload.

Further analogous considerations pertain to other non-protective pole-mounted equipment such as transformers. When a transformer has a malfunction, or its fuse cutout has been activated, and a location thereof is to be determined, it can be cumbersome to send out a service crew that visually inspects each and every transformer.

It is therefore desirable to address the problem mentioned above, and to provide a technology for making pole-mounted equipment able to be monitored in an easy and reliable manner.

SUMMARY

According to an aspect of the present disclosure, a monitoring system for remotely monitoring a state of pole-mounted equipment in a power distribution or transmission grid is provided. The pole-mounted equipment comprises an indicator device configured to present state information indicative of a state of the pole-mounted equipment. The monitoring system comprises a status monitoring device movable via a drive or propulsion system. The status monitoring device is configured to obtain the state information from the indicator device when located within a communication range of the indicator device.

According to another aspect, a monitoring system as described herein is used in monitoring an indicator device of pole-mounted equipment. The indicator device is configured such that it presents a state information. The state information is indicative of the state of the pole-mounted equipment.

According to yet another aspect, a grid equipment system is provided. The grid equipment system comprises pole-mounted equipment connected to a power distribution or transmission grid. The pole-mounted equipment comprises an indicator device that is configured to generate indicator data including state information indicative of a state of the pole-mounted equipment. The grid equipment system further comprises a monitoring system as described herein.

According to yet another aspect, a monitoring method for remotely monitoring a state of a plurality of pieces of pole-mounted equipment in a power distribution or transmission grid is provided. The pieces of pole-mounted equipment each comprise an indicator device that generates indicator data including state information indicative of the state of the respective piece of pole-mounted equipment. The monitoring method is carried out via a monitoring system comprising a status monitoring device movable via a drive or propulsion system. The monitoring method comprises moving the status monitoring device to a location within a communication range of the respective indicator device. The monitoring method further comprises obtaining the indicator data from the indicator device.

BRIEF DESCRIPTION OF THE DRAWINGS

Embodiments of the present disclosure will be presented in the sense of examples and their advantages are explained in greater detail below, with reference to the accompanying drawings, wherein.

DESCRIPTION OF EMBODIMENTS

The disclosed subject-matter will now be described with reference to the drawings. Various structures, systems and devices are schematically depicted in the drawings for purposes of explanation only and so as to not obscure the description with details that are well known to those skilled in the art. The attached drawings are included to describe and explain illustrative examples of the disclosed subject-matter. It is noted that the various features, aspects and embodiments described herein may be combined or omitted as appropriate.

Figure 1:
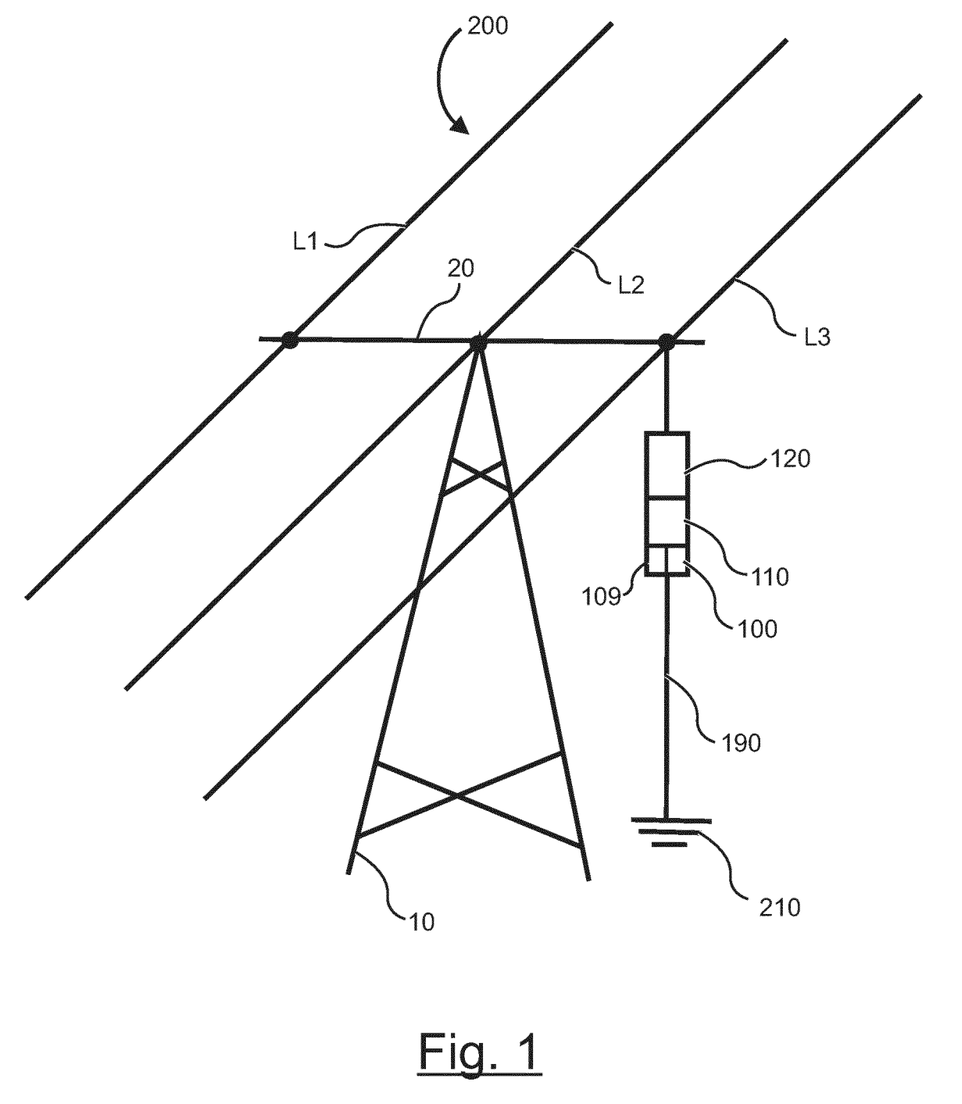
FIG. 1 schematically shows a section of a power grid with a disconnector device according to embodiments.

FIG. 1 schematically shows a section of a power grid 200 according to an embodiment. For reasons of simplicity, details like insulators are not shown in the drawings. In FIG. 1, lines L1 to L3 correspond to AC phases of overhead power lines of the power grid. However, the configuration described herein is not limited to AC applications and may as well be used in an HVDC overhead line configuration, for example. Lines L1 to L3 are typically mounted on insulators (not shown), for example insulators suspended from a traverse section 20 of a pylon or pole 10.

Exemplarily, pole-mounted equipment 120 such as a surge arrester and a disconnector device 110 or spark prevention unit are connected in series between a line (here L3) of the power grid via ground cable 190 to ground 210. The pole-mounted equipment may have a first and a second terminal, wherein the first terminal is electrically connectible to the respective line of the power grid. The disconnector device 110 may have a third and a fourth terminal, wherein the third terminal may be electrically connected to the second terminal of the pole-mounted equipment 120, and the fourth terminal may be electrically connected, via the grounding cable 190, to ground 210.

Herein, pole-mounted equipment is equipment that is adapted to be mounted, directly or indirectly, to the pole 10 of the power grid, and that is to be mounted to the pole 10 during operation Pole-mounted, as used herein, includes for example also parts of the carrying structure of the pole, such as the traverse section 20, and/or parts mounted thereon or suspended therefrom. Preferably, the pole-mounted equipment is adapted to be connected to a line of the grid. In particular aspects, the term "pole-mounted equipment" may be replaced by at least one of a surge arrester, a power transformer, and a fuse cutout.

In case of an overvoltage surge caused by, e.g., a lightning strike, the surge arrester 120 establishes a connection to ground 210 and thereby allows energy of the overvoltage to dissipate to ground, thus limiting effects of the overvoltage surge. However, as mentioned above, the power to be dissipated by the surge arrester 120 may exceed its rated power or maximum power, such that the surge arrester 120 enters an overload condition. In order to avoid such an overload, the disconnector device 110 will, in case of an overload condition, interrupt the connection between the connected line (here L3) of the grid and ground 210. This interruption is also referred to as an activation of the disconnector device 110. Thereby, the current flow through the surge arrester is interrupted. Similarly, the disconnector device 110 may also allow avoiding an overload of other pole-mounted equipment than a surge arrester 120. The power distribution or transmission grid and/or the pole-mounted equipment 120 may be rated for high voltage. A high voltage, for example, may refer to a voltage (effective value) of at least 1 kV, typically at least 10 kV. In case of a distribution transformer, the rated voltage refers to the higher-voltage side of the transformer.

In the present application, the pole-mounted equipment 120 is not limited to surge arresters, possibly having a disconnector device 110 attached thereto. The pole-mounted equipment may comprise one or more of a disconnector, a surge arrester, a fuse cutout, a transformer, and a breaker.

According to an aspect, the pole-mounted equipment 110, 120 comprises an indicator device 100. The indicator device 100 is configured to present state information indicative of a state of the pole-mounted equipment 110, 120. Furthermore, a monitoring system 500 is provided. The monitoring system comprises a status monitoring device 300 which is movable via a drive or propulsion system 400, 450. The status monitoring device 300 is thus non-stationary. The status monitoring device 300 is configured to obtain the state information from the indicator device 100 when it is located within a communication range of the indicator device 100.

The state information may include one or more pieces of information that relate to an operating state of the pole-mounted equipment 110, 120. For example, the state information may be indicative of whether the respective pole-mounted equipment 110, 120 is in an operable state, or if it is in a non-operable or out-of-order state.

In embodiments, in a case in which the pole-mounted equipment 110, 120 comprises at least one of a disconnector, a surge arrester, a fuse cutout and a breaker, the state of the pole-mounted equipment is one of the activated state or the deactivated state.

In the case of the state being one of the activated state and the deactivated state, the pole-mounted equipment 110 is configured for being activated in case of an overload condition. Thereby, the pole-mounted equipment 110, 120 is disconnected from the grid. Disconnecting from the grid, as herein, may include that an electrical path via the respective pole-mounted equipment 120 is interrupted. The electrical path may be a path to ground 210. For example, and not by way of limitation, the state being one of the activated state and the deactivated state indicates whether the disconnector device 110 has been activated or not.

Communication range, as used herein, is considered to be a range in which the state information can be obtained in a reliable manner Communication, in this connection, includes a unilateral communication from the indicator device 100 to the status monitoring device 300. However, a bidirectional communication is not excluded, i. e. communication may also include a bilateral communication from the indicator device 100 to the status monitoring device 300 and vice-versa. The communication range may e. g. be within a maximum of 1000 meters, typically within a maximum of 500 meters or of 100 meters, more typically within a maximum of 50 meters.

Presenting state information indicative of the state of the pole-mounted equipment 110, 120, as used herein, includes for example an optical indication of the state. When an optical indication is used, the communication range is regarded to be a range within which the optical indication can reliably be detected, for example, without limitation, by means of an optical recognition device such as camera device having a suitable image processing capability.

An optical indication may include a passive optical indication. Passive, in this connection, includes any indication that is free from actively transmitting optical signals. For example, a passive indication includes a change of position of a predetermined part of the indicator device 100, a change of color of a predetermined part of the indicator device 100, or a combination thereof.

An optical indication may also include an active optical indication. For example, an active optical indication includes a transmission of light, a change of a light color, an inclusion of coded information in an optical light transmission, and the like.

Presenting state information indicative of the state of the pole-mounted equipment 110, 120, as used herein, includes for example a radio-based indication of the state. When a radio-based indication is used, the communication range is regarded to be a range within which the radio-based indication can reliably be detected, for example, without limitation, by means of a radio detection device such as an RF receiver having a suitable signal processing capability.

It is noted that other way of indicating the state are conceivable, such as an acoustic indication, an indication via magnetic fields, an indication via electrical fields, and so on.

Presenting state information is not limited to the examples indicated above. Also, presenting state information may include a combination of various kinds, such as a combination of optical indication and radio-based indication of the state.

Figure 2:
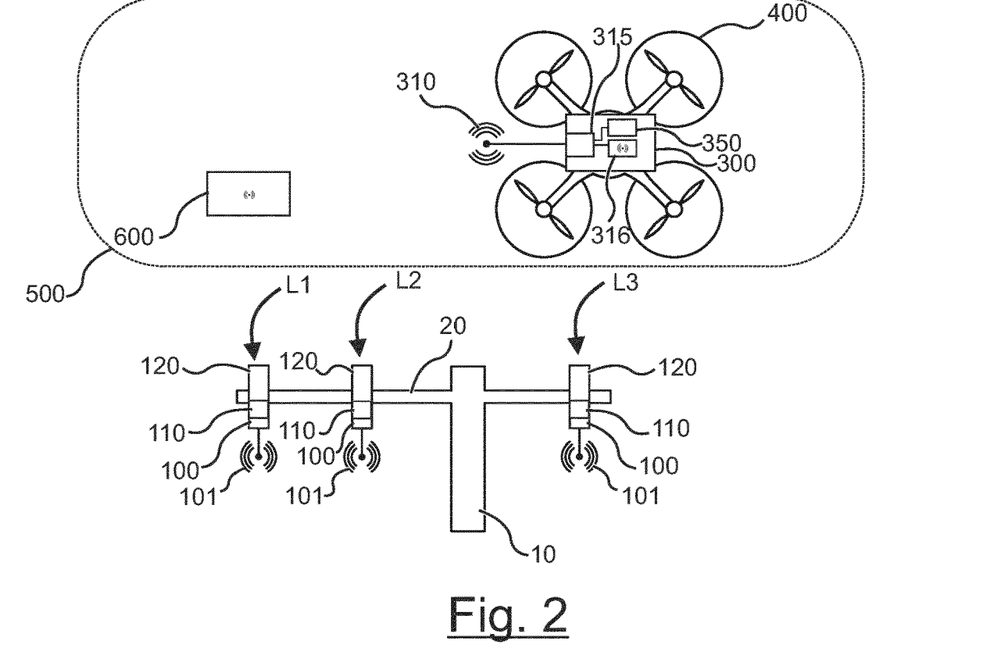
FIG. 2 schematically shows an exemplary configuration of plural disconnector devices mounted on pole-mounted equipment of a power grid, and an exemplary monitoring system, according to an embodiment.
Figure 3:
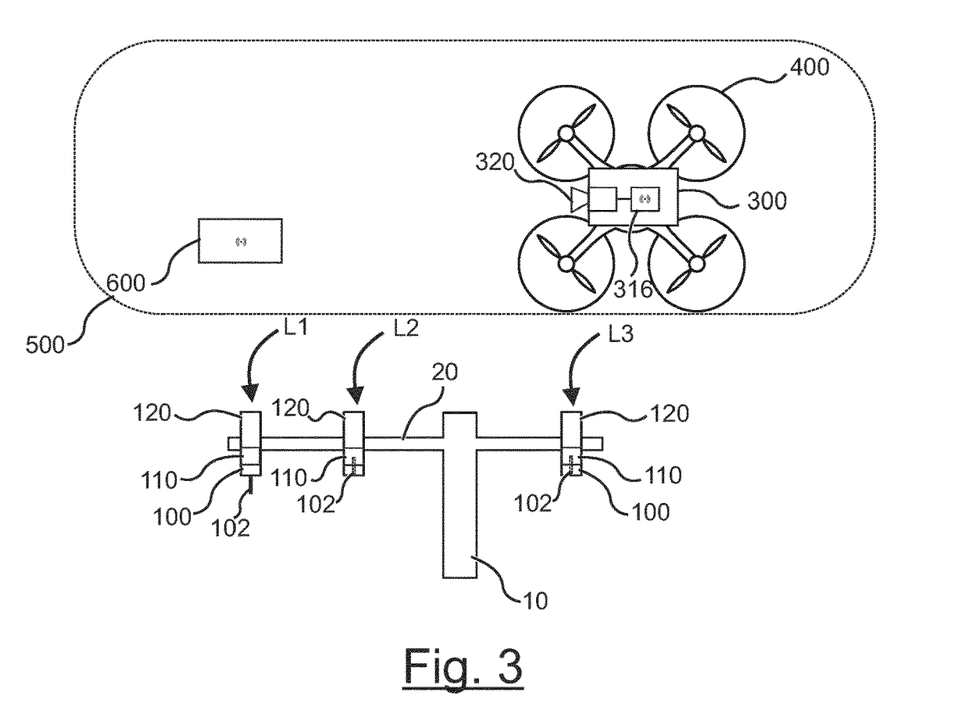
FIG. 3 schematically shows an exemplary configuration of plural disconnector devices mounted on pole-mounted equipment of a power grid, and an exemplary monitoring system, according to another embodiment.

FIGS. 2 and 3 each schematically show an exemplary configuration of plural disconnector devices 110 mounted on pole-mounted equipment 120 of a power grid, and an exemplary monitoring system 500, according to an embodiment. In FIGS. 2 and 3, each line L1, L2, L3 of the phases of the grid 200 has respective pole-mounted equipment 120. Each pole-mounted equipment 120 of lines L1, L2, L3 has a respective disconnector device 110 of lines L1, L2, L3 connected thereto. Each disconnector device 110 of lines L1, L2, L3 has a dedicated indicator device 100. The status monitoring device 300 is configured to obtain the state information of the respective indicator device 100 at each of lines L1, L2, L3, to determine for each respective indicator device whether the corresponding disconnector device 110 of lines L1, L2, L3 is in one of the activated state and deactivated state (to determine for each respective indicator device whether it indicates a state information according to which the corresponding disconnector device 110 of lines L1, L2, L3 is in either the activated state or the deactivated state). The principle is likewise applicable to pole-mounted equipment different from a combination of a surge arrester 120 and a disconnector device 110.

In FIGS. 2 and 3, the status monitoring device 300 is mounted on an aerial vehicle 400, in the present case, a multirotor helicopter. The aerial vehicle 400 may be configured to operate in an autonomous moving mode. In the autonomous moving mode, the aerial vehicle 400 moves autonomously, i. e. without permanent external interaction with its drive system, to a communication range of another indicator device 100 to obtain the state information therefrom. In the autonomous moving mode, the aerial vehicle may for example use map information to move along the communication ranges of the respective indicator devices 100. In an example, in the autonomous moving mode, the aerial vehicle may use a magnetic field emitted by the line L1, L2, L3 when current is flowing therethrough.

In FIGS. 2 and 3, the status monitoring device 300 includes a wireless communication section 316. The wireless communication section 316 is adapted to connect to a wireless communication infrastructure 600 of the monitoring system 500. Connection is made using a wireless communication protocol. The wireless communication section 316 is configured to transmit the indicator data over the wireless communication infrastructure. Typically, the wireless communication infrastructure 600 is provided decentrally, e. g. at one or more fixed locations remote from the status monitoring device 300. The wireless communication infrastructure 600 may, for example, be provided via a long-range radio, a cellular network, or a satellite link.

Transmitting the indicator data over the wireless communication infrastructure may take place regularly. For example, configuration may be such that the indicator data are transmitted each time a state information is obtained. Alternatively, configuration may be such that the indicator data are transmitted after a predetermined or determinable amount of pieces of state information have been obtained. Still alternatively, configuration may be such that the indicator data are transmitted depending on whether a connection from the wireless communication section 316 to the wireless communication infrastructure 600 can be established at a certain point in time. For example, communication may be hindered by bad RF conditions depending on the current location of the status monitoring device, or the time of day. Then, communication can be made when it is determined that RF conditions are suitable for transmission.

In FIG. 2, the status monitoring device 300 further includes a position determination unit 350. The position determination unit 350 may be a satellite-based position determination system such as, but not limited to, GPS, GLONASS, GALILEO, BAIDU and others. The status monitoring device 300 is configured to generate indicator data including the position data from the position determination unit 350, and the state information.

In embodiments, the indicator device is configured to generate the indicator data in a continuous manner. In other embodiments, the indicator device is configured to generate the indicator data in a periodical manner.

In embodiments, the indicator device is configured to generate the indicator data at multiple points in time. For example, the indicator device 100 generates the indicator data periodically. Preferably, the indicator data are generated every second or less. More preferably, the indicator data are generated every two seconds or less. Even more preferably, the indicator data are generated every five seconds or less.

In embodiments, the indicator device 100 comprises a radio-detectable indicator 101. The status monitoring device 300 comprises a radio detection device 315 for determining the radio-detectable indicator 101. In FIG. 2, the radio detection device 315 is connected to a radio antenna 310. In FIGS. 2 and 3, the plurality of indicator devices 100 each comprise a radio-detectable indicator 101.

A radio-detectable indicator 101 typically includes an actively transmitting device. For example, an actively transmitting radio-detectable indicator 101 is configured to transmit a signal including the state information indicative of the state of the pole-mounted equipment. In an example, the signal is transmitted in regular time intervals, such as in a beacon mode. For example, the signal is transmitted every second or less. More preferably, the signal is transmitted every two seconds or less. Even more preferably, the signal is transmitted every five seconds or less.

A radio-detectable indicator 101 may also include a passive radio device. The radio device being a passive radio device, as used herein, is understood such that it does not have or does not need a local power supply, such as a wired power supply, in order to perform the transmission. For example, an RFID radio device is considered passive in this sense, since it can be constructed and operated such that it transmits information upon having harvested energy from an external field, such as an external magnetic or external electromagnetic field, and by modulating the energy thereof. An RFID radio device is also considered passive also in the case that it has an auxiliary internal power supply for processing but does not involve energy therefrom to initiate the transmitting operation. Energy for waking up the passive radio device and subsequently start the processing and the transmission of information, such as for transmission of the indicator radio signal, is provided from outside of the passive radio device.

The radio-detectable indicator 101 may, for example, be based on RFID technology, Bluetooth technology, Wi-Fi, LoRa, or any other appropriate physical layer.

In embodiments, such as shown in FIG. 1, the indicator device 100 comprises a radio receiver 109. The radio receiver 109 is configured such that upon reception of a trigger signal, the radio receiver 109 causes the indicator device 100 to generate the indicator data. For example, the radio receiver 109 is configured such that upon reception of the trigger signal, an indicator device 100 comprising a radio-detectable indicator 101 is caused to transmit the signal having the indication. Configuration may also be such that upon reception of the trigger signal, an indicator device 100 comprising an active optical indicator is caused to transmit an optical signal having the indication.

In embodiments, configuration may also be such that the indicator data are pre-generated. For example, the indicator device 100 comprising the radio-detectable indicator 101 is put into a generation mode, e. g. by an internal clock, in predetermined time intervals, such as, but without limitation, once a day, twice a day etc. In the generation mode, the indication data are generated, but not transmitted. When the radio receiver 109 receives the trigger signal, the radio receiver 109 causes the indicator device 100 to transmit the pre-generated indicator data.

The radio receiver 109 may be configured such that it listens continuously for the trigger signal. The radio receiver 109 may also be configured such that it listens for a specific dedicated frequency or a specific dedicated radio modulation pattern.

In embodiments, such as shown in FIG. 3, the indicator device 100 comprises an optically detectable indicator 102. For example, the optically detectable indicator 102 or optical indicator is an element that is made to protrude from the indicator device 100 to signal a state of the pole-mounted equipment. In a variant, the optically detectable indicator 102 may have a color different from the surrounding, e. g. a color different from the color of a housing of the indicator device 100. In a further variant, the optically detectable indicator 102 may have a parts of the mechanical assembly that change locations, depending on the state, with respect to other parts of the same assembly. In the embodiment of FIG. 3, for example, the optically detectable indicator 102 is made to protrude from the indicator device 100 in case the disconnector device 110 has been activated, like the one on the line L1. In the example, in the case that the disconnector device 110 has not been activated, the optically detectable indicator 102 is for example located inside a housing of the indicator device 100, like the ones on lines L2 and L3.

In embodiments, such as that shown in FIG. 3, the status monitoring device 300 comprises an optical detection device 320. The optical detection device 320 comprises, for example and without limitation, a camera device. The camera device may be configured to input a captured image or a captured image sequence into an image processing device (not shown) in the monitoring system 500 to determine the state of the pole-mounted equipment from the indication shown by the optically detectable indicator.

Figure 4:
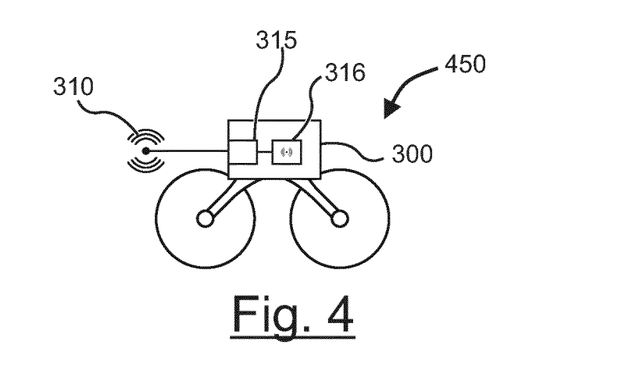
FIG. 4 schematically shows a monitoring device of a monitoring system, according to another embodiment.
Figure 5:
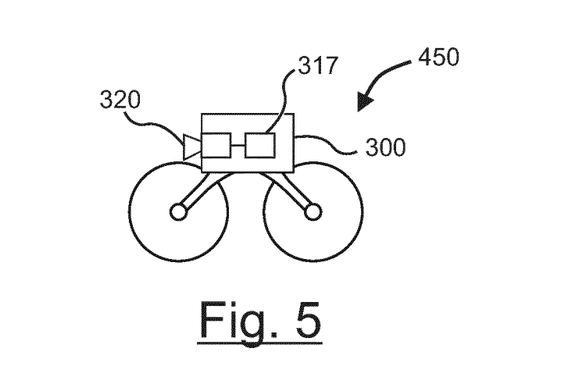
FIG. 5 schematically shows a monitoring device of a monitoring system, according to another embodiment.

FIG. 4 schematically shows a status monitoring device 300 of a monitoring system 500 according to another embodiment. FIG. 5 schematically shows a status monitoring device 300 of a monitoring system 500 according to yet another embodiment. For the sake of simplicity, details of the monitoring system, as well as details of the grid 200 including poles 10 and the pole-mounted equipment 110, 120 having an indicator device 100 are omitted from FIGS. 4 and 5. Yet, the configuration thereof may be any suitable one, such as one of those shown in FIG. 2 or 3.

While in the embodiments shown in FIGS. 2 and 3, the status monitoring device 300 is mounted on an aerial vehicle, the status monitoring device 300 in the embodiments shown in FIGS. 4 and 5 is mounted on a ground vehicle 450. As with the aerial vehicle, the ground vehicle 450 may be configured to operate in an autonomous moving mode. In the autonomous moving mode, the ground vehicle 450 moves autonomously, i. e. without permanent external interaction with its drive system, to a communication range R of another indicator device 100 to obtain the state information therefrom.

In embodiments, such as that shown in FIG. 4, the status monitoring device 300 comprises a radio detection device 315 for determining the radio-detectable indicator 101. In FIG. 4, the radio detection device 315 is connected to a radio antenna 310. Also with the ground vehicle 450, a detection via the radio-detectable indicator 101 can be made, like in the embodiment of FIG. 2. In FIG. 4, the status monitoring device 300 includes the wireless communication section 316 as described above e. g. in connection with FIG. 2. The wireless communication section 316 is adapted to connect to the wireless communication infrastructure 600 (shown e. g. in FIG. 2) of the monitoring system 500. Connection is made using a wireless communication protocol. The wireless communication section 316 is configured to transmit the indicator data over the wireless communication infrastructure.

In embodiments, such as that shown in FIG. 5, the status monitoring device 300 comprises the optical detection device 320, as e. g. also shown and described above in connection with FIG. 3. The optical detection device 320 comprises, for example and without limitation, a camera device. The camera device may be configured to input a captured image or a captured image sequence into an image processing device (not shown) in the monitoring system 500 to determine the state of the pole-mounted equipment from the indication shown by the optically detectable indicator.

In embodiments, such as that shown in FIG. 5, the status monitoring device 300 further includes a data recording section 317. The data recording section 317 is configured to record the indicator data. For example, the data recording section 317 may record the indicator data of a plurality of indicator devices 100 that the monitoring device 300 has captured on its course. Preferably, the recorded indicator data are supplemented with a time stamp, a location stamp (e. g. captured via position determination unit 350), or both. Upon returning to a base location, the status monitoring device 300 may be configured to submit the data (e. g., transmit the data, dump the data, have the data read out) for further processing thereof. In a variant, the data recording section 317 may record the indicator data during a time period in which a (wireless) transmission of data or a connection cannot be established; the recorded data may then be (wirelessly) transmitted upon a future successful establishment of the transmission or connection.

It is noted that the embodiments of FIGS. 2-5 may be arbitrarily combined if need be. For example, the data recording section 317 may be included in the aerial-vehicle-mounted status monitoring device 300 of FIGS. 2-3, or in the ground-vehicle-mounted status monitoring device 300 of FIG. 4. For example, an optical detection device 320 may be included in any of the status monitoring devices 300 of FIG. 2 or 4 as well. For example, a radio detection device 310 may be included in any of the status monitoring devices 300 of FIG. 3 or 5 as well. For example, an optically detectable indicator 102 and/or a radio-detectable indicator 101 may be included in any of the configurations of FIGS. 2-5.

Figure 6:
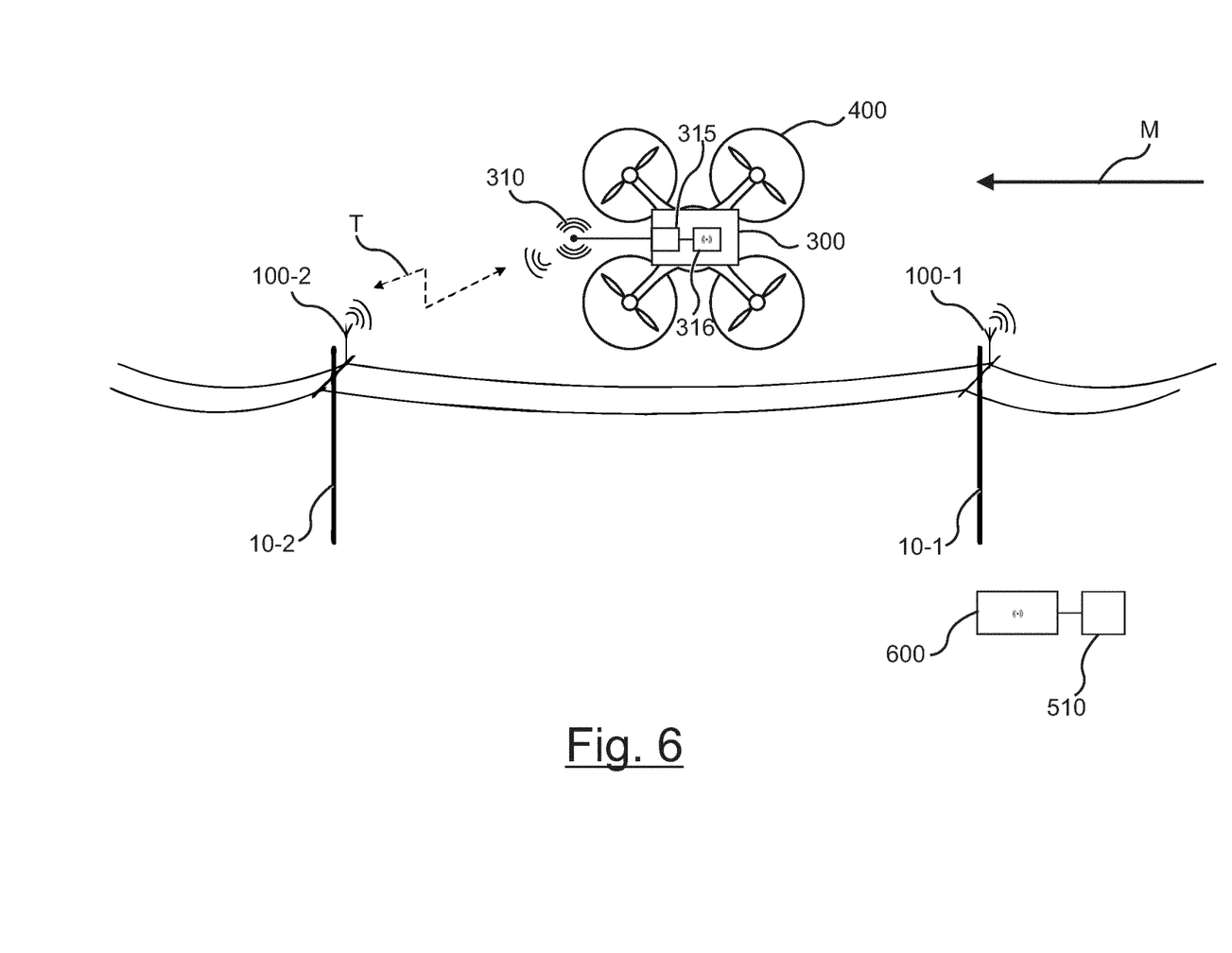
FIG. 6 schematically shows a grid configuration having plural poles, and respective indicator devices assigned to each pole.
Figure 7:
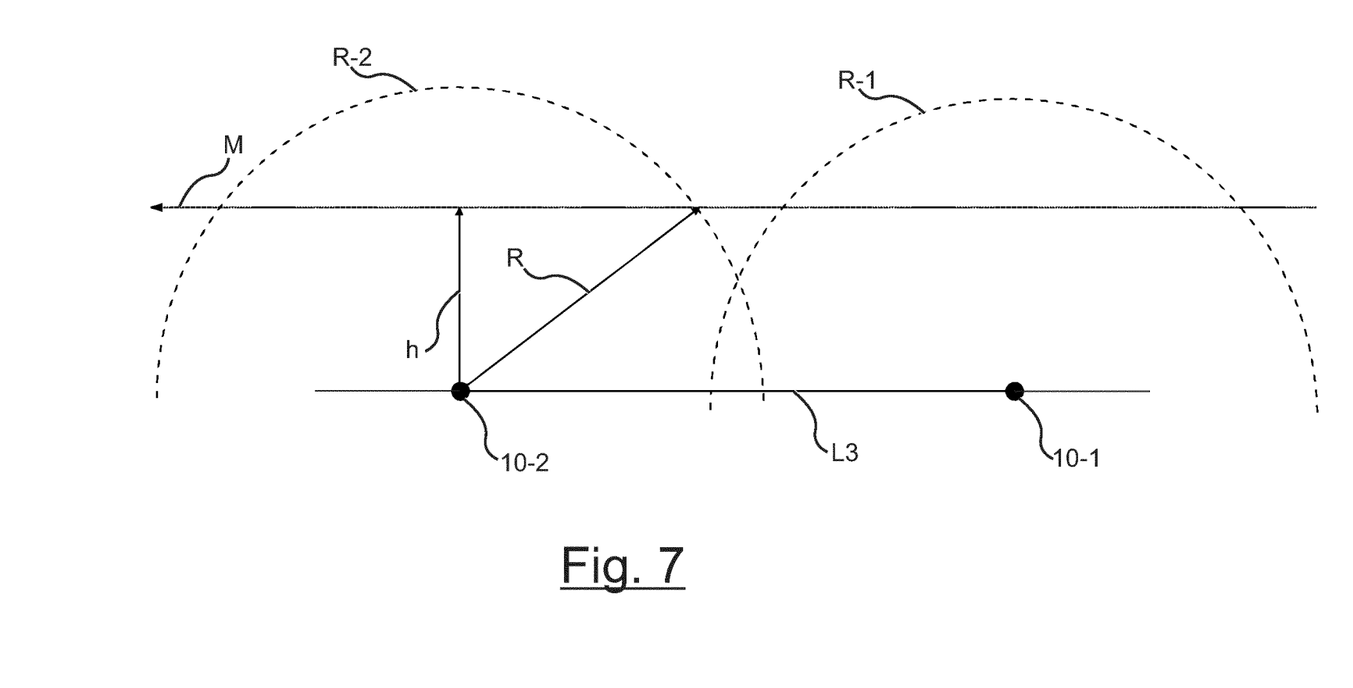
FIG. 7 schematically shows an illustration of communication ranges of the plural indicator devices of FIG. 6.

FIG. 6 schematically shows a grid configuration having a plurality of poles 10-1, 10-2, and respective indicator devices 100-1, 100-2 assigned to each pole 10-1, 10-2. FIG. 7 schematically shows an illustration of communication ranges R-1, R-2 of each of the plurality of indicator devices 100-1, 100-2 of FIG. 6.

A moving direction M of the status monitoring device 300 is schematically indicated by an arrow. Note that the status monitoring device 300 is shown as mounted on an aerial vehicle 400 in FIG. 6, but this is only for illustration purposes and not by way of limitation. Typically, a plurality of poles 10-1, 10-2 exceeding the number of two is provided to support a segment of the grid. The status monitoring device 300 moves from pole 10-1 to pole 10-2 and then possibly further. The status monitoring device 300 collects indication data from one or more indication devices 100-1, 100-2 mounted on the different poles 10-1, 10-2. In the example of FIG. 6, the indication devices 100-1, 100-2 each comprise a radio-detectable indicator 101 (not shown in FIG. 6). A radio transmission T is carried out on each of the indication devices 100-1, 100-2 as the status monitoring device is located inside a respective communication range R-1, R-2 (see FIG. 7). Note that the example of FIG. 6 is also applicable to the detection of indicator devices 100 other than radio-detectable indicators 101, for example, and without limitation, those having optically detectable indicators 102.

In FIG. 6, the status monitoring device 300 is equipped with a wireless communication section 316 configured to communicate with wireless communication infrastructure 600, as described above. The status monitoring device 300 is configured to transmit the indicator data over the wireless communication infrastructure 600.

In the example of FIG. 6, a control device 510 is connected to the wireless communication infrastructure. The control device 510 may take the indicator data received via the wireless communication infrastructure 600 for further processing and/or storage. Alternatively, or additionally, the control device 510 may be configured to cause the status monitoring device 300 (the aerial vehicle 400, the ground vehicle) to move to a location within a communication range R-1, R-2 of an indicator device 100-1, 100-2, preferably one or more next indicator devices 100-1, 100-2.

As illustrated in FIG. 7, the overhead line (here, merely as an example and without limitation, L3) is supported directly or indirectly on a plurality of poles 10-1, 10-2. The poles 10-1, 10-2 have a substantially constant or a varying distance to each other, and the status monitoring device 300 moves substantially at a height h from the line L3 in the moving direction. Note that the height is usually not constant and typically varies due to the line L3 being bent through, an aerial vehicle 400 or a ground vehicle 450 supporting the status monitoring device 300 travelling at a trajectory having a non-constant height, and so on. Communication ranges R-1, R-2 (e. g. reception ranges) for each indicator device 100 are schematically shown. When the status monitoring device 300 moves along the moving direction M, it enters a communication range R-2 at a location R. During the time that the status monitoring device 300 is located inside the communication range R-2, it obtains the state information from the indicator device 100-2.

In embodiments, the pole-mounted equipment is equipped with a sensor assessing the state of the pole-mounted equipment. The radio detection device 315, via the radio antenna 310, can obtain the state information from the sensor when the radio detection device 315 is within the communication range R. The radio detection device 315 can sequentially obtain the respective state from a plurality of sensors.

In embodiments, the obtained state information is pushed to a network, for example an internet cloud appliance. This may be performed either in real-time or at a moment when the wireless infrastructure 600 is accessible.

Configuration may be such that the status monitoring device 300 moves and passes by a plurality of indicator devices 100 without a need to decelerate, or without a need to stop. A wireless communication link T may have established during a connection time window given by the respective communication range R (e. g., R-1, R-2) and the moving speed in the moving direction M. For example, an approximation of the time during which this is possible is given under the assumption of a straight-line moving trajectory and a line-of-sight communication through: $T = 2 \cdot \sqrt{R^2 - h^2}/v$, where R is the communication range (a wireless link reach), h is the distance between the status monitoring device 300 and the radio-detectable indicator 101, and v is the moving speed.

As a non-limiting example merely for illustration purposes, an aerial vehicle flying at a speed of 200 km/h at 20 m above the indicator device 100 and a communication range of 50 m (e. g., without limitation, Bluetooth Low Energy) is considered. The time window T for communication has a length of 1.5 s.

As a further non-limiting example merely for illustration purposes, the communication range is 1 km (e. g., without limitation, LoRa). In this example, the time window T for communication has a length of 36 s.

Figure 8A:
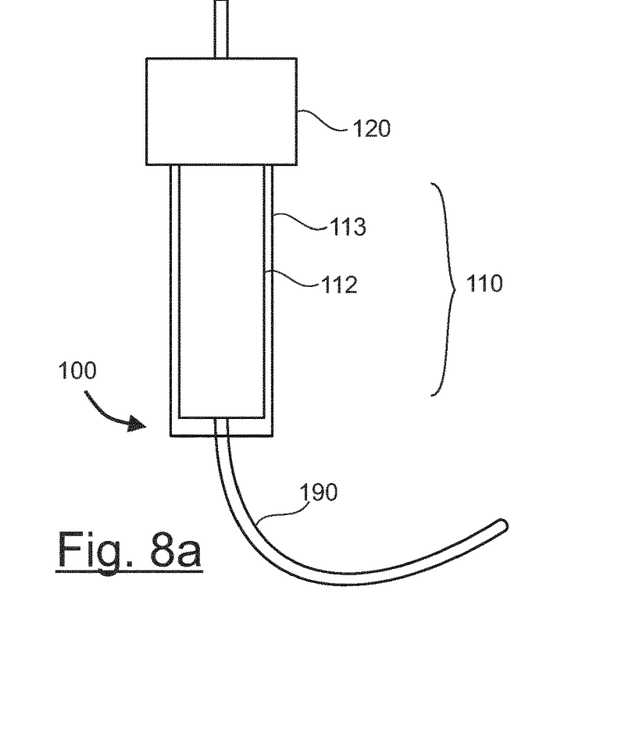
FIGS. 8a and 8b schematically show an exemplary configuration of a pole-mounted equipment and disconnector device according to an embodiment, having an indicator device with an optically detectable indicator.
Figure 8B:
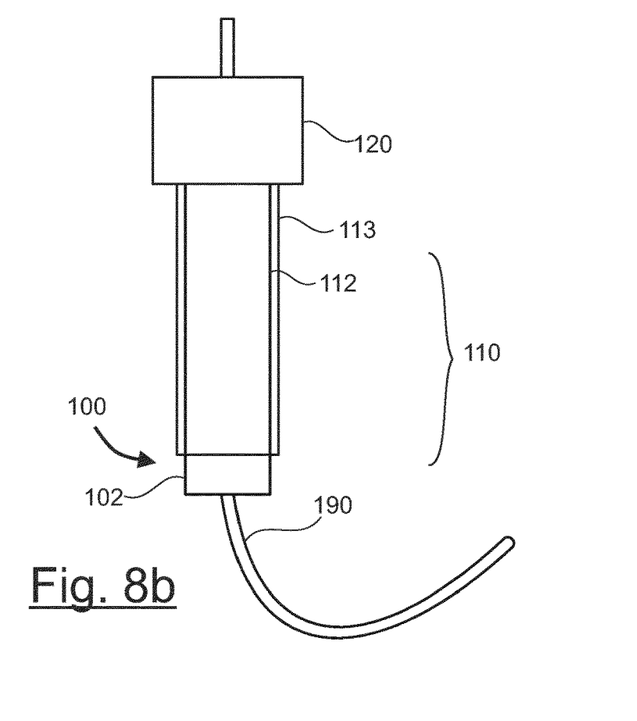

FIGS. 8*a* and 8*b* schematically show an exemplary configuration of a pole-mounted equipment comprising a surge arrester 120 and a disconnector device 110 according to an embodiment, having an indicator device 100 with an optically detectable indicator 102. In FIG. 8a, the disconnector device is shown in a deactivated state. The pole-mounted equipment, in FIGS. 8a and 8b a surge arrester 120, is connected, via the disconnector device 110, to the ground cable 190. The ground cable 190, in turn, is connected to ground 210, as shown e. g. in FIG. 1. When the surge arrester 120 becomes conductive in case of an overvoltage condition, the energy is dissipated via the disconnector device 110 and the ground cable 190 to ground 210. In FIG. 8b, the disconnector device 110 is shown in an activated state, wherein the connection from the surge arrester 120 to the ground cable 190 and ground 210 is interrupted. FIG. 8b thus shows the activated, or triggered, state of the disconnector device 110.

In FIGS. 8a and 8b, the disconnector device has an fixed or stationary part 113 and a moving part 112. In the example shown in the drawings, the fixed part 113 and the moving part 112 are made of a plastic material, but there is no limitation in terms of the material used. The moving part 112 is configured such as to move in the axial direction. A fully inserted position of the moving part 112 with respect to the fixed part 113 is shown in FIG. 8a, while a partially moved out position of the moving part 112 with respect to the fixed part 113 is shown in FIG. 8b.

In the embodiment shown in FIGS. 8a and 8b, as an example, a tip end part of the moving part 112 serves as an optically detectable indicator 102. When the optically detectable indicator 102 is not visible, as shown in FIG. 8a, this reflects one state of the pole-mounted equipment 110, 120 (here, the deactivation state of the disconnector device 110). When, in turn, the optically detectable indicator 102 is visible, as shown in FIG. 8b, this reflects another state of the pole-mounted equipment 110, 120 (here, the activation state of the disconnector device 110). The state may be detected by means of an optical detection device of the status monitoring device 300, as described above.

An optical detection device 320 comprising a camera device and having image processing capabilities, as described above, may be used to obtain the state information from the optically detectable indicator 102. The optical detection device 320 according to the embodiment may detect the presence of respective pole-mounted equipment 120, 110 within a frame and determine whether it has a certain state. For example, determination may involve a detection of whether the disconnector device 110 was triggered or activated. The optical detection device 320 may, for example, determine that a disconnector device 110 was triggered, and record or transmit this state information, possibly together with a time-stamp and/or a location stamp.

Configuration may be such that the status monitoring device 300 has predetermined information on the locations of the pole-mounted equipment 110, 120 (information on the locations of the poles 10-1, 10-2) to be detected. Once at such a predetermined location, the camera device is pointed into the direction of the pole-mounted equipment 110, 120, and an image is captured to be analysed. For example, location determination (GPS etc.) magnetic positioning, and inertial measurements are used for this purpose.

Configuration may alternatively be such that the status monitoring device 300 has no or insufficient/incomplete predetermined information on the locations of the pole-mounted equipment 110, 120 to be detected. The camera device detects the presence of the electrical infrastructure, such as the lines L1, L2, L3 and/or the poles 10-1, 10-2. The camera device may feed information on the electrical infrastructure back to e. g. the aerial vehicle 450 or the ground vehicle 400 to aid in navigation. The camera device detects the presence of poles 10-1, 10-2. Once a pole 10-1, 10-2 is encountered, the camera device is directed in a suitable manner to capture an image of the pole-mounted equipment 110, 120 to be analysed.

Configuration may alternatively be such that the status monitoring device 300 or the aerial vehicle 400 or ground vehicle 450, respectively, are controlled by an operator that captures images of poles of interest, or a video. The captured visual information is augmented with a location stamp (geotagging) and/or a time stamp. An online or offline analysis may be performed to detect the state of the indictor device 100 of interest.

Figure 9:
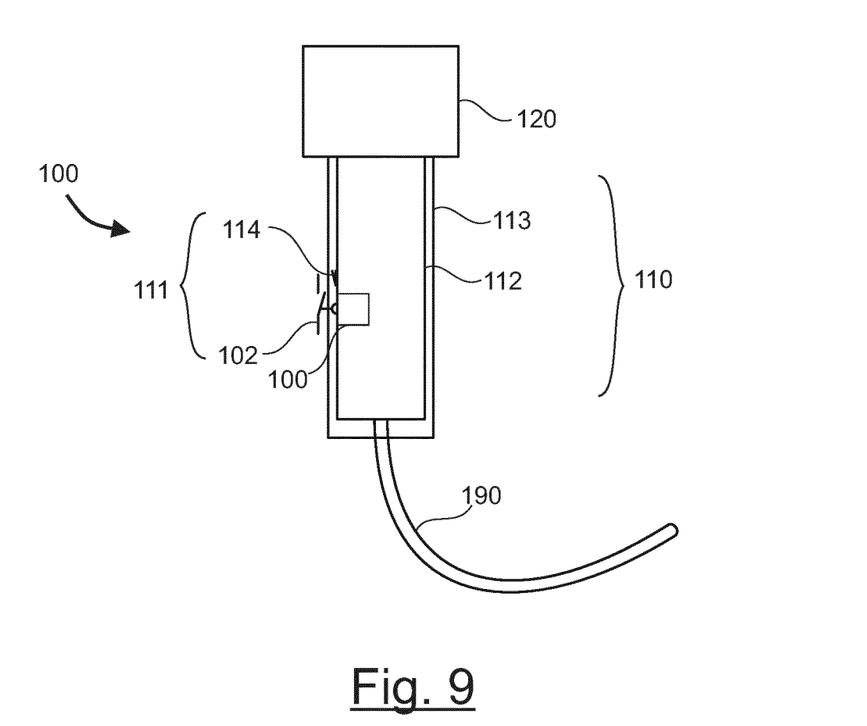
FIG. 9 schematically shows an exemplary configuration of a pole-mounted equipment and disconnector device according to another embodiment, having an indicator device with a radio-detectable indicator.

FIG. 9 schematically shows an exemplary configuration of a pole-mounted equipment having a surge arrester 120 and disconnector device 110 similar to that of FIGS. 8a and 8b, according to another embodiment. In the embodiment of FIG. 9, the configuration has an indicator device 100 with a radio-detectable indicator 101, as described above. Again, as described in connection with FIGS. 8a and 8b, the disconnector device has a fixed or stationary part 113 and a moving part 112. In the example shown in the drawings, the fixed part 113 and the moving part 112 are made of a plastic material, but there is no limitation in terms of the material used. The moving part 112 is configured such as to move in the axial direction. For simplicity, only the state is shown in FIG. 9 in which the disconnector device 110 is in the deactivated state, similar to FIG. 8a.

In the embodiment shown in FIG. 9, an activation interactor 111 comprises a switch 102, for example a pressure switch. The switch 102 is arranged on the fixed part 113. A bulge 114 is mechanically fixed on the inner part 112. A property of the activation interactor 111 is changed depending on whether the disconnector device 110 has been activated. When the disconnector device 110 is activated, the switch 102 is pressed by the bulge 114 arranged on the moving part 112. The activation indicator 100 is configured to change a behavior of the radio-detectable indicator 101 according to the activation or deactivation state of the disconnector device 110.

The invention claimed is:

1. A monitoring system for remotely monitoring a state of pole-mounted equipment in a power distribution or transmission grid, the pole-mounted equipment comprising an indicator device configured to present state information indicative of a state of the pole-mounted equipment, wherein the indicator device comprises a fixed part and a moving part that is movable relative to the fixed part from a first static position indicative of a deactivated state to a second static position indicative of an activated state, the monitoring system comprising:
  a status monitoring device movable via a drive or propulsion system, wherein the status monitoring device is configured to obtain the state information from the indicator device when located within a communication range of the indicator device;
  wherein the state information is indicated by the moving part of the indicator device being in one of the first static position relative to the fixed part or the second static position relative to the fixed part, and wherein the status monitoring device comprises an optical detection device for determining the state information based on optically detecting whether the moving part of the indicator device is in the first static position relative to the fixed part or the second static position relative to the fixed part.

2. The monitoring system according to claim 1, wherein the pole-mounted equipment comprises one or more selected from the group consisting of: a disconnector, a surge arrester, a fuse cutout, a transformer, a breaker.

3. The monitoring system according to claim 2, wherein in the case that the pole-mounted equipment comprises at least one of the disconnector, the surge arrester, the fuse cutout and the breaker, the state of the pole-mounted equipment is one of an activated state and a deactivated state, and the pole-mounted equipment is configured for being activated in case of an overload condition, thereby disconnecting the pole-mounted equipment from the grid.

4. The monitoring system according to claim 1, wherein the monitoring system further comprises a control circuit configured to cause the status monitoring device to move to a location within the communication range (R) of the indicator device.

5. The monitoring system according to claim 4, wherein the status monitoring device further comprises a position determination circuit, and wherein the status monitoring device is configured to generate indicator data including the position data from the position determination circuit and the state information.

6. The monitoring system according to claim 1, wherein the status monitoring device is configured to be operated in an autonomous moving mode.

7. The monitoring system according to claim 1, wherein the status monitoring device is mounted on a ground vehicle.

8. The monitoring system according to claim 1, wherein the movable status monitoring device is mounted on an unmanned aerial vehicle.

9. The monitoring system according to claim 1, wherein the state information comprises a radio-detectable indicator, and wherein status monitoring device comprises a radio detection device for determining the radio-detectable indicator.

10. The monitoring system according to claim 1, wherein the indicator device is configured to generate the indicator data at multiple points in time.

11. The monitoring system according to claim 1, wherein the status monitoring device further comprises a wireless communication section adapted to connect to a wireless communication infrastructure using a wireless communication protocol, and to transmit the indicator data over the wireless communication infrastructure.

12. The monitoring system according to claim 1, wherein the status monitoring device further comprises a data recording circuit adapted to record the indicator data.

13. A method, comprising:
using the monitoring system according to claim 1 in monitoring the indicator device of pole-mounted equipment, the indicator device being configured to present a state information indicative of the state of the pole-mounted equipment.

14. A grid equipment system, comprising:
the monitoring system according to claim 1.

15. The grid equipment system according to claim 14, wherein the pole-mounted equipment comprises one or more selected from the group consisting of: a disconnector, a surge arrester, a fuse cutout, a transformer, a breaker;
wherein the pole-mounted equipment is electrically connected, through a disconnector device, between a line of the power distribution and transmission grid and ground; and
wherein the state is one of an activated state and a deactivated state of the disconnector device.

16. A monitoring method for remotely monitoring a state of a plurality of pieces of pole-mounted equipment in a power distribution or transmission grid, wherein the pieces of pole-mounted equipment each comprise an indicator device that generates indicator data including state information indicative of the state of the respective piece of pole-mounted equipment, wherein the indicator device comprises a fixed part and a moving part that is movable relative to the fixed part from a first static position indicative of a deactivated state to a second static position indicative of an activated state, wherein the monitoring method is carried out via a monitoring system comprising a status monitoring device movable via a drive or propulsion system, wherein the monitoring method comprises:
moving the status monitoring device to a location within a communication range of the respective indicator device; and
obtaining the indicator data from the indicator device, wherein the state information is indicated by the moving part of the indicator device being in one of the first static position relative to the fixed part or the second static position relative to the fixed part, and wherein the status monitoring device comprises an optical detection device for determining the state information based on optically detecting whether the moving part of the indicator device is in the first static position relative to the fixed part or the second static position relative to the fixed part.

17. The method of claim 16, comprising moving the status monitoring device sequentially to the respective communication range of the plurality of pieces of pole-mounted equipment.

18. A monitoring system for remotely monitoring a state of pole-mounted equipment in a power distribution system, the monitoring system comprising:
a mobile status monitoring device configured to obtain state information indicative of a state of the pole-mounted equipment from an indicator device included in the pole-mounted equipment when the mobile status monitoring device is located within a communication range of the indicator device, wherein the indicator device comprises a fixed part and a moving part that is movable relative to the fixed part from a first static position indicative of a deactivated state to a second static position indicative of an activated state;
wherein the state information is indicated by the moving part of the indicator device being in one of the first static position relative to the fixed part or the second static position relative to the fixed part, and wherein the mobile status monitoring device comprises an optical detection device for determining the state information based on optically detecting whether the moving part of the indicator device is in the first static position relative to the fixed part or the second static position relative to the fixed part.

* * * * *